(12) United States Patent
Barati

(10) Patent No.: US 8,436,056 B2
(45) Date of Patent: May 7, 2013

(54) NANOCOMPOSITE ION EXCHANGE HYDROGELS

(76) Inventor: Abolfazl Barati, Arak (IR)

( * ) Notice: Subject to any disclaimer, the term of this patent is extended or adjusted under 35 U.S.C. 154(b) by 274 days.

(21) Appl. No.: 12/983,031

(22) Filed: Dec. 31, 2010

(65) Prior Publication Data

US 2011/0098369 A1 Apr. 28, 2011

(51) Int. Cl.
*C08J 5/22* (2006.01)
(52) U.S. Cl.
USPC .............................................. 521/27; 977/778
(58) Field of Classification Search .................... 521/27; 977/778
See application file for complete search history.

(56) References Cited

FOREIGN PATENT DOCUMENTS

CN 101225145 A1 * 7/2008

OTHER PUBLICATIONS

Al et al. "Synthesis and properties of starch-graft-acrylic acid/Na-montmorillonite superabsorbent nanocomposite hydrogels", Journal of Applied Polymer Science (2008), 109(1), 16-22.*

* cited by examiner

*Primary Examiner* — Michael M Bernshteyn

(57) ABSTRACT

A method for preparing a nanocomposite ion exchange hydrogel includes graft polymerizing a monomer onto a carbohydrate to form a carbohydrate graft copolymer. Before, during, or after graft polymerizing, an adsorbent is modified with a cationic surfactant to form a surfactant modified adsorbent. Next, the surfactant modified adsorbent is dispersed and entrapped in the carbohydrate graft copolymer and crosslinked to form a crosslinked carbohydrate graft copolymer. The crosslinked carbohydrate graft copolymer is then isolated.

19 Claims, 4 Drawing Sheets

_US 8,436,056 B2_

NANOCOMPOSITE ION EXCHANGE HYDROGELS

SPONSORSHIP STATEMENT

This application has been sponsored by the Iranian Nanotechnology Initiative Council and the Arak University, which do not have any rights in this application.

TECHNICAL FIELD

This application generally relates to ion exchange materials, and more particularly relates to nanocomposite ion exchange materials, such as nanocomposite ion exchange hydrogels, including at least one adsorbent.

BACKGROUND

The excessive presence of phosphorous and nitrogen species in surface and ground water is due, in part, to the application of fertilizers in agriculture, the treatment of municipal wastewater, and the mineral processing industry. High concentrations of nitrogen containing compounds, such as nitrate, nitrite and ammonium, in drinking water can be hazardous to the environment and to human health. For example, nitrate ions can cause cyanosis in children and nitrite ions may cause the appearance of cancers in the digestive system through the formation of nitrosamines or nitrosamides.

Therefore, various techniques, such as biological denitrification, chemical reduction, reverse osmosis, ion exchange, and adsorbtion, have been utilized for the removal of nitrogen ions from water. However, each technique includes its inherent limitations. For example, biological denitrification may not be effective at temperatures below 7° C. and, therefore, may not be useful for treating ground water. Chemical reduction requires the use of various chemicals that may release toxic compounds into the environment, especially when $H_2$ is used as a reductant. Reverse osmosis may not be economical for large water treatment facilities.

Current ion exchange techniques are relatively expensive and retain sulfate and hydrogen carbonate, which induce significant changes in the water composition. In addition, current ion exchange techniques can increase the chloride concentration in water because ion exchange hydrogels replace nitrate with chloride. Adsorption can be used to collect soluble substances from a solution on a suitable interface. For example, adsorption onto activated carbon has been used to treat wastewater. However, activated carbon is relatively expensive, making it uneconomical for large scale water treatment.

SUMMARY

A method for preparing a nanocomposite ion exchange hydrogel is disclosed. A monomer is graft polymerized onto a carbohydrate to form a carbohydrate graft copolymer. Before, during, or after graft polymerizing, an adsorbent is modified with a cationic surfactant to form a surfactant modified adsorbent. Next, the surfactant modified adsorbent is dispersed and entrapped in the carbohydrate graft copolymer and crosslinked to form a crosslinked carbohydrate graft copolymer. The crosslinked carbohydrate graft copolymer is then isolated. In some embodiments, the pH of the crosslinked carbohydrate graft copolymer can be adjusted. The crosslinked carbohydrate graft copolymer can be a nanocomposite ion exchange hydrogel.

In some embodiments, graft polymerizing can include solution polymerizing in water, the monomer can be an unsaturated carboxylic acid monomer, such as, for example, acrylic acid, and the carbohydrate can be a polysaccharide. The weight ratio of the carbohydrate to the monomer can range from 1:1 to 1:8. The graft polymerizing can be performed in the presence of an initiator, such as, for example, a redox initiator, a thermal initiator, or a mixture thereof. The monomer can be neutralized by, for example, applying potassium hydroxide solution to the monomer. The carbohydrate can be gelatinized.

In some embodiments, the adsorbent can be, for example, nanosized zeolite-A and/or nanosized clinoptilolite. The cationic surfactant can be one or more of hexadecyltrimethyl ammonium bromide (HDTMA-Br), hexadecyltrimethylammonium chloride (HDTMA-Cl), hexadecyltrimethylammonium hydrogen sulfate (HDTMA-HSO4), triethylammonium bromide, trimethylammonium bromide, benzyltriethylammonium chloride, sodium lauryl sulphate, tetrapropoylammonium bromide (TPA-Br), tetrabutylammonium bromide (TBA-Br), tetramethylammonium bromide (TMA-Br), and tetrabutylammonium hydroxide (TBA-OH).

In some embodiments, the crosslinked carbohydrate graft can be dried and/or extruded. The crosslinked carbohydrate graft copolymer can be coated to minimize reagglomeration.

A nanocomposite ion exchange hydrogel can be prepared by a process including graft polymerizing a monomer onto a carbohydrate to form a carbohydrate graft copolymer, modifying an adsorbent with a cationic surfactant to form a surfactant modified adsorbent, dispersing and entrapping the surfactant modified adsorbent in the carbohydrate graft copolymer and crosslinking to form a crosslinked carbohydrate graft copolymer, and isolating the crosslinked carbohydrate graft copolymer.

Details of one or more embodiments and/or implementations of nanocomposite ion exchange hydrogels are set forth in the accompanying drawings and the description below. Other aspects that can be implemented will be apparent from the description and drawings, and from the claims.

DESCRIPTION OF DRAWINGS

Like reference symbols indicate like elements throughout the specification and drawings.

DETAILED DESCRIPTION

Nanocomposite ion exchange materials, such as, nanocomposite ion exchange hydrogels, can include nanosized adsorbents, such as, nanosized surfactant-modified zeolites, that enable both anionic and cationic exchange between a source and the nanocomposite ion exchange hydrogels with high selectivity. The nanosized adsorbents are included both on and within the hydrogels. As such, contaminates, such as, for example, metals, ions, and/or proteins, can be removed and/or recovered from the source. For example, a nanocomposite ion exchange hydrogel can be adapted to remove nitrates and phosphates from water, to recover transition metals in the refinement of sugar, to recover proteins from fermentation broths and agricultural by-products, and to separate pharmaceuticals.

Figure 1:
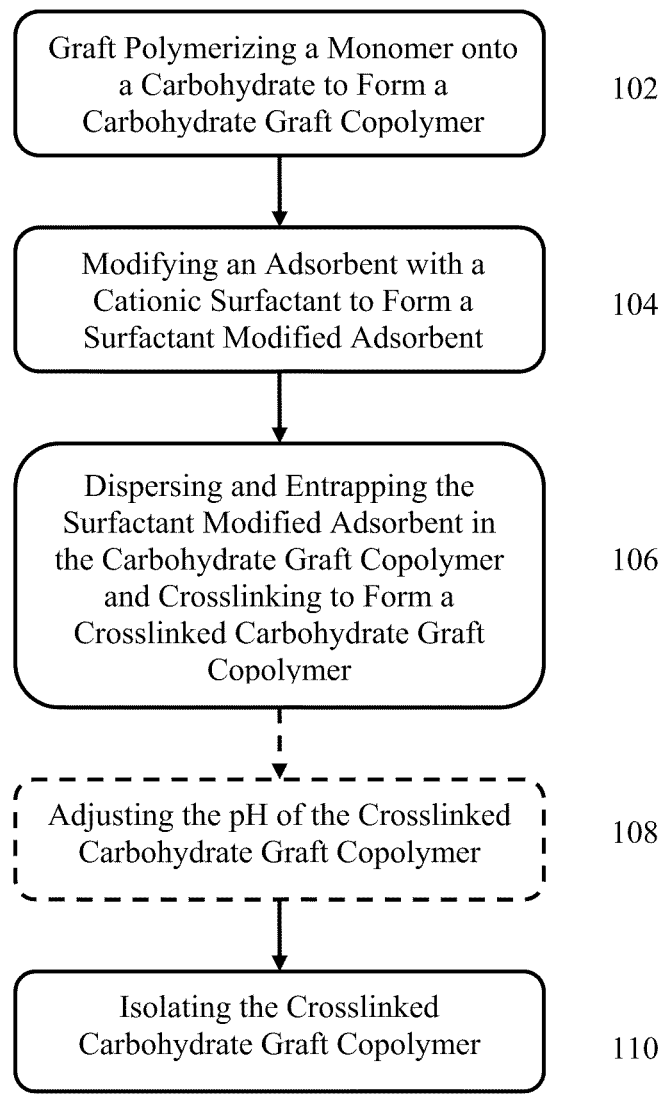
FIG. 1 is a flowchart of an example of a process for preparation of a nanocomposite ion exchange hydrogel.

Referring to FIG. 1, an example of a process for preparation of a nanocomposite ion exchange hydrogel is disclosed. Referring to step 102, initially, a monomer is graft polymerized onto a carbohydrate to form a carbohydrate graft copolymer. In some embodiments, the monomer can have ion exchange properties.

Graft polymerization of the monomer can be performed by various methods, such as, for example, bulk polymerization, mass polymerization, solution polymerization, spray polymerization, inverse emulsion polymerization, suspension polymerization, and/or inverse suspension polymerization. Preferably, a solution polymerization can be performed in step 102 using water as the solvent in a continuous or batch wise fashion.

In some embodiments where the nanocomposite ion exchange hydrogel is based on a weak acidic hydrogel, the monomer can be, preferably, an unsaturated carboxylic acid monomer, or its salts thereof, such as, for example, acrylic acid and its alkali and/or ammonium salts and mixtures thereof. In other embodiments where the nanocomposite ion exchange hydrogel is based on a weak acidic hydrogel, the monomer can be, for example, methacrylic acid, ethacrylic acid, α-chloroacrylic acid, α-cyanoacrylic acid, β-methacrylic acid (crotonic acid), 2-methyl-2-butene dicarboxylic acid, α-phenylacrylic acid, β-acryloxypropionic acid, sorbic acid, α-chlorosorbic acid, angelic acid, cinnamic acid, p-chlorocinnamic acid, β-stearylacrylic acid, itaconic acid, citraconic acid, mesaconic acid, glutaconic acid, aconitric acid, maleic acid, fumaric acid, tricarboxyethylene, maleic anhydride, fumaric anhydride, itaconic anhydride, citraconic anhydride, mesaconic anhydride, methyl itaconic anhydride, ethyl maleic anhydride, diethyl maleate, methyl maleate, and other, α,β-unsaturated carboxylic acids and anhydrides, salts thereof, partial salts thereof, and/or mixtures thereof.

In some embodiments where the nanocomposite ion exchange hydrogel is based on a strong acidic hydrogel, the monomer can be, preferably, a sulfonic acid monomer, such as, for example, 2-acrylamido-2-methyl-1-propanesulfonic acid (AMPS), methallyl sulfonic acid, vinyl sulfonic acid, alkali thereof, and/or ammonium salts thereof.

In some embodiments, the strong acidic resin of the strong acidic hydrogel can be, for example, a polymer prepared from a monomer containing a sulfonate, sulfate, phosphonate, or phosphate group as the acid group. Sulfonate groups can be generated from monomers containing functional groups hydrolyzable to the sulfonic acid form, such as, for example, alkenyl sulfonic acid compounds and sulfoalkylacrylate compounds. Ethylenically unsaturated sulfonic acid monomers include, for example, aliphatic or aromatic vinyl sulfonic acids, such as vinylsulfonic acid, allyl sulfonic acid, vinyl toluene sulfonic acid, styrene sulfonic acid, acrylic, and methacrylic sulfonic acids, such as sulfoethyl acrylate, sulfoethyl methacrylate, sulfopropyl acrylate, 2-vinyl-4-ethylbenzene, 2-allylbenzene sulfonic acid, 1-phenyl-ethylene sulfonic acid, sulfopropyl methacrylate, 2-hydroxy-3-methacryloxypropyl sulfonic acid, and 2-acrylamide-2-methylpropane sulfonic acid.

Sulfate groups can be generated by reacting homopolymers or copolymers containing hydroxyl groups or residual ethylenic unsaturation with sulfuric acid or sulfur trioxide. Examples of such treated polymers include sulfated polyvinyl alcohol, sulfated hydroxyethyl acrylate, and sulfated hydroxypropyl methacrylate. Phosphate groups are generated by copolymerizing ethylenically unsaturated monomers containing a phosphoric acid moiety, such as methyacryloxy ethyl phosphate, with the α,β-unsaturated carboxylic acid.

In some embodiments, where the nanocomposite ion exchange hydrogel is based on an acidic hydrogel, the acidic resin of the acidic hydrogel can be poly(acrylic acid), hydrolyzed starch-acrylonitrile graft copolymers, starch-acrylic acid graft copolymers, saponified vinyl acetate-acrylic ester copolymers, hydrolyzed acrylonitrile copolymers, hydrolyzed acrylamide copolymers, ethylene-maleic anhydride copolymers, isobutylene-maleic anhydride copolymers, poly (vinylsulfonic acid), poly(vinylphosphonic acid), poly(lactic acid), and mixtures thereof.

In some embodiments, the monomer can be, for example, one or more amides, such as, for example, acrylamide and/or methacrylamide, and/or one or more acrylates, such as, for example, ethyl acrylate and/or potassium acrylate. In some embodiments, derivatives and/or mixtures of any of the possible monomers listed above may be used to form the carbohydrate graft copolymer.

In some embodiments, to modify the carbohydrate graft copolymer properties, other monomers that are soluble in the aqueous polymerization mixture up to 30% by weight can be included. For example, monomers, such as, acrylamide, methacrylamide, (meth)allyl alcohol ethoxylates, and/or mono(meth)acrylic acid esters of alcohols or ethoxylates can optionally be included in the aqueous polymerization mixture.

In other embodiments, partially hydrolyzed acrylic acid may be graft polymerized onto a carbohydrate without another monomer such as acrylamide. For example, partially hydrolyzed acrylic acid may be graft polymerized under heat and/or pressure in, for example, a heated screw extruder.

The acidic monomers can be subjected to neutralization. In some embodiments, if polymerization is conducted directly with the acidic monomers, neutralization can be effected following polymerization. In other embodiments, preferably, the acidic monomer components can be neutralized to 20-95% and, more preferably, to 50-80% prior to polymerization such that the acidic monomer is present as sodium, potassium, and/or ammonium salt at the start of polymerization.

In some embodiments, the bases used for neutralization can be those that do not adversely affect the polymerization. For example, sodium and/or ammonia can be used and, more preferably, potassium hydroxide solution can be used as a base for neutralization. In some embodiments, before initiating polymerization, the partially neutralized monomer solution can be cooled to a temperature below 30° C. and, preferably, to a temperature below 20° C.

In some embodiments, the carbohydrate can be a polysaccharide, such as, for example, a starch, cellulose, flour, a meal, carbohydrate waste, and/or crop residues. The starch can include native starches, such as, for example, corn starch, waxy maize starch, wheat starch, potato starch, dextrin starches, and dextran starches, corn meal, wheat flour, rice flour, wheat straw, rice straw, corn straw, and/or germinated waste carbohydrate.

In some embodiments, the carbohydrate may be gelatinized to provide optimal absorbency. In one implementation, the gelatinized carbohydrate can be wheat and potato starch. In some embodiments, the weight ratio of the starch to the monomer can range from about 1:1 to 1:8.

In some embodiments, the graft polymerization of the monomer onto the carbohydrate can be performed in the presence of an initiator. The initiator can be, for example, a redox initiator, a thermal initiator, or a mixture thereof. Exemplary initiators can include ammonium persulfate, sodium persulfate, potassium persulfate, ferrous peroxide, hydrogen peroxide, L-ascorbic acid, and/or potassium permanganate-ascorbic acid. The amount of initiator used may vary based on the particular initiator, monomer, and carbohydrate. Some initiators, such as persulfates, may require the presence of heat. One or more initiators may be added in a single step or in multiple steps.

Referring to step 104, before, during, or after the step 102 of graft polymerizing, a nanosized adsorbent can be modified with a cationic surfactant to form a surfactant modified adsorbent. The adsorbent can be an inorganic powder that is inert in aqueous liquid, such as, for example, inorganic compound fine particles and/or clay mineral fine particles. The inorganic powder can have an appropriate hydrophilic property and be substantially insoluble in water.

Exemplary inorganic powders can include, for example, metal oxides, such as silicon dioxide and titanium oxides, silicic acids (salts), natural zeolites, synthetic zeolites, kaolin, talc, clays, and/or bentonite. Exemplary natural zeolites can include, for example, clinoptilolite, faujasite, and/or erionite, and exemplary synthetic zeolites can include, for example, NaA, Y, T, ZSM-5, MCM-41, and/or SAPO-34. The zeolites can be nanosized, i.e., have average particle diameters of 100 nm or less.

In some embodiments, surfactant-modified zeolites can adsorb anions through the sorption of cationic surfactant on the zeolite surface. In properly chosen conditions, the sorbed surfactant molecules form bilayers on the zeolite crystals surface, with the first layer retained by cation exchange and the second layer being attached by hydrophobic bonding and stabilized by counter anions. As discussed in greater detail below with reference to TABLE 1, surfactant modified nanosized clinoptilolite and surfactant modified nanosized synthetic NaA-type zeolites in ion exchange hydrogels were found to be more effective in adsorbing anions relative to other tested adsorbents.

The surfactant can be, for example, one or more of hexadecyltrimethyl ammonium bromide (HDTMA-Br), hexadecyltrimethylammonium chloride (HDTMA-Cl), hexadecyltrimethylammonium hydrogen sulfate (HDTMA-HSO$_4$), triethylammonium bromide, trimethylammonium bromide, benzyltriethylammonium chloride, sodium lauryl sulphate, tetrapropoylammonium bromide (TPA-Br), tetrabutylammonium bromide (TBA-Br), tetramethylammonium bromide (TMA-Br), and/or tetrabutylammonium hydroxide (TBA-OH).

Figure 2:
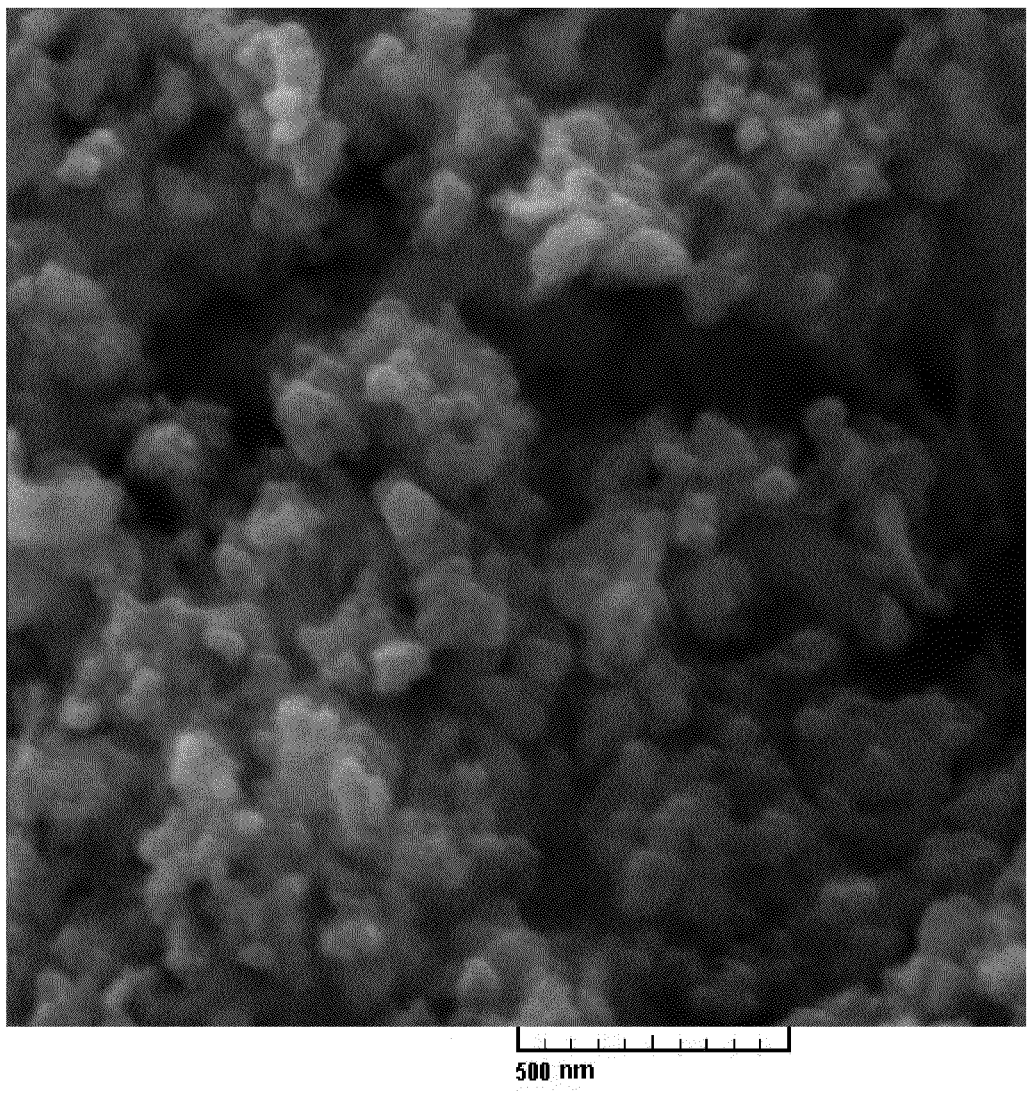
FIG. 2 is a scanning electron microscope image of an example nanosized surfactant modified adsorbent powder.

Referring to FIG. 2, a scanning electron microscope image of an example nanosized surfactant modified adsorbent powder resulting from step 104, where the adsorbent is clinoptilolite, is illustrated.

Referring to step 106, the surfactant modified adsorbent can be dispersed and entrapped in the carbohydrate graft copolymer and the carbohydrate graft copolymer including the surfactant modified adsorbent can be crosslinked using a crosslinking agent, such as, for example, a crosslinking monomer, to form a crosslinked carbohydrate graft copolymer.

In some embodiments, the surfactant modified adsorbent can be dispersed in the carbohydrate graft copolymer by blending the surfactant modified adsorbent with the carbohydrate graft copolymer using an apparatus such as, for example, a twin screw extruder. In some embodiment, the surfactant modified adsorbent can be dispersed in the carbohydrate graft copolymer by adding the surfactant modified adsorbent to the carbohydrate graft copolymer mixture and then in situ polymerizing them so that the surfactant modified adsorbent are entrapped in the carbohydrate graft copolymer.

Sufficient amounts of crosslinking monomers having more than one reactive group in their molecules are co-polymerized together with the above-mentioned monomers, thereby forming high degree of internal crosslinking such that the resultant nanocomposite ion exchange hydrogels cannot absorb large amounts of fluids and, as such, do not swell like typical superabsorbent polymers.

Bi- or multifunctional crosslinking monomers can include, for example, amides, such as methylene-bis-acryl or methacrylamide, and/or ethylene-bis-acrylamide; allyl compounds such as allyl(meth)acrylate, triallyl cyanurate, maleic acid diallyl ester, polyallyl esters, tetraallyloxyethane, triallylamine, tetraallylethylenediamine, allyl esters of phosphoric acid or phosphorous acid; N-methylol compounds of unsaturated amides, such as methacrylamide and/or acrylamide and the ethers derived therefrom; esters of polyols and alkoxylated polyols, such as diacrylates or triacrylates, such as butanediol or ethylene glycol diacrylate, polyglycol di(meth)acrylates, trimethylolpropane triacrylate; and methacrylate esters and pentaerythritol of glycerol. In some embodiments, amides, triallylamine, acrylates of polyhydric alcohols or alkoxylates, and/or methallyl alcohol acrylates or alkoxylates can preferably used at the crosslinking agent.

The crosslinking monomers range from 1.0 to 10.0% by weight and, preferably, from 2.0 to 8.0% by weight and, more preferably, from 3.0 to 6.0% by weight of the total monomers.

Referring to step 108, in some embodiments, the pH of the crosslinked carbohydrate graft copolymer can be optionally adjusted to a desired value for the particular ion exchange application of interest, i.e., depending on the type of contaminate that the resultant nanocomposite ion exchange hydrogel will be used to remove. For example, the crosslinked carbohydrate graft copolymer may be neutralized to convert carboxyl groups to sodium or potassium salts. The resulting pH for most ion exchange applications may range from about 6.0 to 8.0.

In some embodiments, the step 108 of adjusting the pH may occur prior to step 106 of dispersing and entrapping. For example, in methods that may require saponification, the step 108 pH adjustment may be a faster and more economic alternative to saponification. Exemplary materials that may be used to effect pH adjustment can include, for example, sodium hydroxide, potassium hydroxide, sodium methoxide, potassium methoxide, or a mixture thereof. In some embodiments, the materials can be optionally be diluted in methanol or other solvents.

In some embodiments, pH adjustment may not be necessary. For example, if sodium acrylate and/or potassium acrylate were used as the monomer in lieu of acrylic acid, the resulting mixture may already be within an acceptable pH range.

Referring to step 110, the crosslinked carbohydrate graft copolymer can be isolated. In some embodiments, the crosslinked carbohydrate graft copolymer can be dried on, for example, a heated drum, or via air drying. The dried crosslinked carbohydrate graft copolymer, i.e., nanocomposite ion exchange hydrogel, may then be, for example, palletized, granularized, and/or extruded. In some embodiments, the crosslinked carbohydrate graft copolymer can be extruded through, for example, a heated screw to form granules of the nanocomposite ion exchange hydrogel.

The granules of the crosslinked carbohydrate graft copolymer are not limited to a particular structure or shape. Rather, each crosslinked carbohydrate graft copolymer granule contains at least one micro-domain of an acidic hydrogel and at least one nano-domain of a basic adsorbent in close proximity to one another for improved ion exchange properties. In some embodiments, the at least one micro-domain of the acidic hydrogel and at least one nano-domain of the basic adsorbent can be in contract.

In some embodiments, to minimize reagglomeration, the granules of the nanocomposite ion exchange hydrogel may be coated with a dusting agent, such as, for example, cellulose, clay, starch, flour, carbohydrate waste, crop residue, and/or other natural or synthetic polymers. In other embodiments, the granules may be lightly sprayed with methanol to prevent reagglomeration.

In yet other embodiments, isolation can be effected by precipitating the crosslinked carbohydrate graft copolymer using water-miscible solvents, such as, for example, alcohols, such as methanol, ethanol, propanol, isopropanol, and/or glycol. Immersing the nanocomposite ion exchange hydrogel in alcohol may cause the nanocomposite ion exchange hydrogel to precipitate into and the alcohol removes the water and extraneous salts from the crosslinked carbohydrate graft copolymer.

Figure 3:
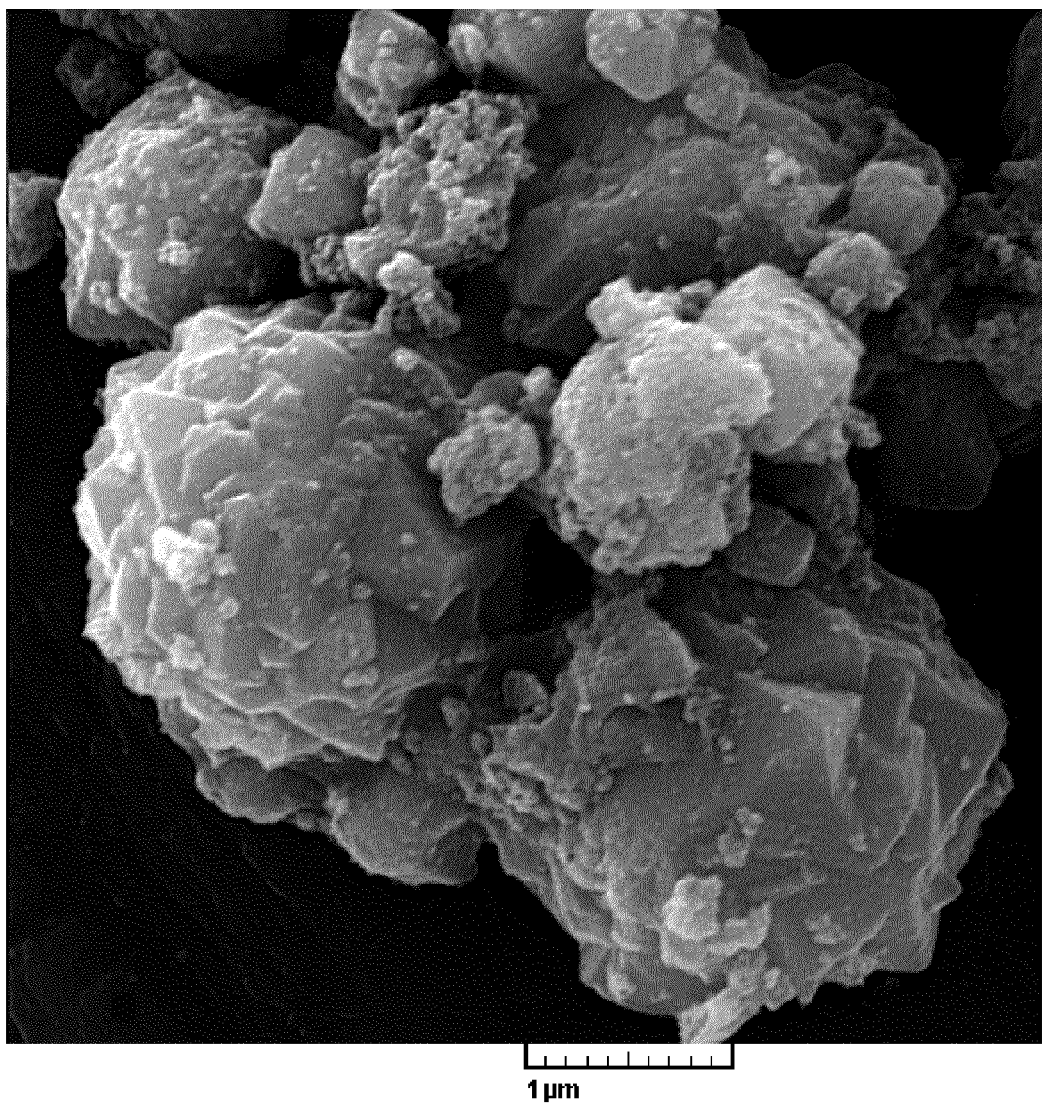
FIG. 3 is a scanning electron microscope image of an example nanocomposite ion exchange hydrogel.

FIG. 3 is a scanning electron microscope image of an example nanocomposite ion exchange hydrogel.

Nanocomposite Ion Exchange Hydrogel Preparation Example 1

To prepare the carbohydrate, a uniform suspension including 395 ml of deionizer water and 60 grams of 200 mesh wheat straw was prepared in a 1.5 liter resin kettle using a mechanical stirrer operating at 250 rpm. The suspension was then heated to a temperature between 85° C. and 95° C. using an oil bath. The suspension was maintained at the temperature for approximately 30 minutes, at which time the oil bath was turned off, and the suspension was cooled to 60° C. The suspension was then purged with nitrogen.

To prepare the monomer, a solution of 110 ml of acrylic acid and 85 ml of deionized water was prepared in a 500 ml beaker. Using 70 ml of 50% potassium hydroxide solution, partial neutralization (degree of neutralization: 80%) was effected with stirring and cooling. The solution was then cooled to a temperature between 18° C. and 22° C.

Next, the solution of neutralized acrylic acid was added to the wheat straw suspension and ammonium persulfate (3 grams dissolved in 10 ml of deionized water) was added to the suspension to initiate polymerization reaction. The resulting mixture was stirred for approximately five minutes to form the carbohydrate graft copolymer (step 102).

Nanosized zeolite-A was washed with distilled water several times till its filtrate pH was between 10.0 and 10.5. Next, 10 grams of the washed zeolite A was mixed with hexadecyltrimethyl ammonium bromide (HDTMA-Br) having a concentration of 100 mg/l at a 1:100 (solid:liquid) ratio. The solution was agitated for 7 to 8 hours at 150 rpm on shaker at a pH between 8.0 and 8.5. The solution was then filtered and the solid residue was washed with double distilled water and air dried for 6 hours. The solid residue was then mechanically ground with a ball-mill apparatus and then sonicated in an ultrasound bath to form the surfactant modified adsorbent (step 104).

Next, 10 grams of the surfactant modified adsorbent suspended in 30 ml of deionized water was added to the carbohydrate graft copolymer suspension and the resulting mixture was stirred for approximately five minutes. Then, methylene bis-acrylamide (3 grams dissolved in 60 ml of deionized water) was added to the suspension, and the resulting mixture was stirred for approximately five minutes. The resulting suspension was heated to approximately 80° C. and held at that temperature for approximately 15 minutes all while being stirred to form the crosslinked carbohydrate graft copolymer, i.e., the nanocomposite ion exchange hydrogel (step 106).

The resulting crosslinked carbohydrate graft copolymer was dried in a tunnel dryer and then extruded (step 110) so that a composite, granular nanocomposite hydrogel having a density of 1.05 grams per milliliter and moisture content of 10% was formed.

Figure 4:
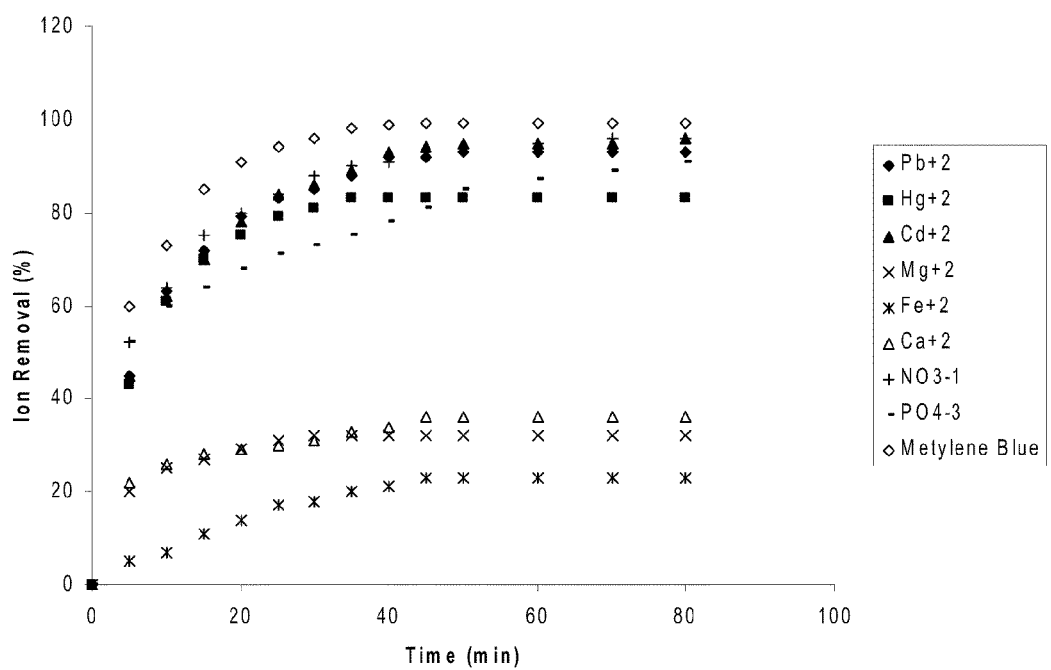
FIG. 4 is a graph of the adsorption of nitrate and other anions or cations by the nanocomposite ion exchange hydrogel prepared in EXAMPLE 1.

The adsorption of nitrate and other anions or cations by the resulting nanocomposite ion exchange hydrogel, designated as NCH-1, was measured and is shown in TABLE 1 and FIG. 4.

Nanocomposite Ion Exchange Hydrogel Preparation Example 2

The same procedure as described in EXAMPLE 1 was repeated with the difference that the nanosized zeolite-A was modified with hexadecyltrimethylammonium hydrogen sulfate (HDTMA-HSO$_4$) having a concentration of 100 mg/l as the cationic surfactant. The adsorption of nitrate by the resulting nanocomposite ion exchange hydrogel, designated as NCH-2, was measured and is shown in TABLE 1.

Nanocomposite Ion Exchange Hydrogel Preparation Example 3

The same procedure as described in EXAMPLE 1 was repeated with the difference that the natural nanosized zeolite clinoptilolite was used as the inorganic adsorbent instead of zeolite-A. The adsorption of nitrate by the resulting nanocomposite ion exchange hydrogel, designated as NCH-3, was measured and is shown in TABLE 1.

Nanocomposite Ion Exchange Hydrogel Preparation Example 4

The same procedure as described in EXAMPLE 3 was repeated with the difference that the natural nanosized zeolite, clinoptilolite, was modified with hexadecyltrimethylammonium hydrogen sulfate (HDTMA-HSO$_4$) having a concentration of 100 mg/l as the cationic surfactant. The adsorption of nitrate by the resulting nanocomposite ion exchange hydrogel, designated as NCH-4, was measured and is shown in TABLE 1.

Nanocomposite Ion Exchange Hydrogel Preparation Example 5

The same procedure as described in EXAMPLE 1 was repeated with the difference that wheat starch was used to prepare the carbohydrate rather than wheat straw. The adsorption of nitrate by the resulting nanocomposite ion exchange hydrogel, designated as NCH-5, was measured and is shown in TABLE 1.

Nanocomposite Ion Exchange Hydrogel Preparation Example 6

The same procedure as described in EXAMPLE 5 was repeated with the difference that the natural nanosized zeolite, clinoptilolite, was used as the inorganic adsorbent instead of zeolite-A. The adsorption of nitrate by the resulting nanocomposite ion exchange hydrogel, designated as NCH-6, was measured and is shown in TABLE 1.

TABLE 1

| Sample | Initial Nitrate Concentration (mg/l) | Concentration after X minutes | | | | | | | | Removal Percentage |
|---|---|---|---|---|---|---|---|---|---|---|
| | | 10 | 20 | 30 | 40 | 50 | 60 | 70 | 80 | |
| NCH-1 | 500 | 180 | 100 | 60 | 45 | 32 | 25 | 20 | 18 | 96.4% |
| NCH-2 | 500 | 210 | 140 | 82 | 57 | 40 | 31 | 23 | 16 | 96.8% |
| NCH-3 | 500 | 270 | 193 | 124 | 103 | 86 | 72 | 66 | 65 | 87.0% |
| NCH-4 | 500 | 293 | 210 | 135 | 101 | 82 | 69 | 61 | 58 | 88.8% |
| NCH-5 | 500 | 173 | 96 | 58 | 43 | 28 | 21 | 18 | 16 | 96.8% |
| NCH-6 | 500 | 258 | 185 | 118 | 97 | 83 | 70 | 64 | 64 | 87.2% |

As illustrated by TABLE 1, between 87.0% and 96.8% of nitrate was removed after 80 minutes from an aqueous solution using the 5 grams of the nanocomposite ion exchange hydrogels formed in EXAMPLES 1 to 6 for each liter of aqueous solution. The best performing nanocomposite ion exchange hydrogels were those of EXAMPLES 2 and 5.

It is to be understood the implementations are not limited to the particular processes, devices, and/or apparatus described which may, of course, vary. For example, although FIG. 1 illustrates that a monomer is graft polymerized onto a carbohydrate to form a carbohydrate graft polymer in step 102, an adsorbent is modified with a cationic surfactant to form a surfactant modified adsorbent in step 104, the surfactant modified adsorbent is dispersed and entrapped in the carbohydrate graft copolymer and crosslinked to form a crosslinked carbohydrate graft copolymer in step 106, the pH of the crosslinked carbohydrate graft copolymer may be adjusted in step 108, and the crosslinked carbohydrate graft copolymer is isolated in step 110, it is to be understood that many possible orderings of the steps can be used in the process of FIG. 1, depending on the particular nanocomposite ion exchange hydrogel to be produced and/or user preference. Therefore, any order of steps 102-110 are within the scope of the present application.

In some embodiments, two or more adsorbents, such as surfactant modified adsorbents, can be dispersed and entrapped in the nanocomposite ion exchange hydrogel. Each of the adsorbents can be used to adsorb and/or remove different anions or cations, or to adsorb and/or remove the same anion or cation.

In some embodiments, the nanocomposite ion exchange hydrogels can contain substances other than monomers and carbohydrates. The additional substances may be, for example, a multivalent metal and/or hydrophilic inorganic powder to improve or alter the anionic absorption/adsorption of the nanocomposite ion exchange hydrogel.

It is also to be understood that the terminology used herein is for the purpose of describing particular implementations only, and is not intended to be limiting. As used in this application, the singular forms "a", "an" and "the" include plural referents unless the content clearly indicates otherwise.

Reference in the specification to "one embodiment" or "an embodiment" means that a particular feature, structure, characteristic, or function described in connection with the embodiment is included in at least one embodiment herein. The appearances of the phrase "in some embodiments" in the specification do not necessarily all refer to the same embodiment.

Accordingly, other implementations are within the scope of this application.

What is claimed is:

1. A method for preparing a nanocomposite ion exchange hydrogel, the method comprising:

graft polymerizing a monomer onto a carbohydrate to form a carbohydrate graft copolymer;

modifying an adsorbent with a cationic surfactant to form a surfactant modified adsorbent;

dispersing and entrapping the surfactant modified adsorbent in the carbohydrate graft copolymer and crosslinking to form a crosslinked carbohydrate graft copolymer; and isolating the crosslinked carbohydrate graft copolymer.

2. The method of claim 1, further comprising adjusting the pH of the crosslinked carbohydrate graft copolymer.

3. The method of claim 1, wherein graft polymerizing the monomer onto the carbohydrate to form the carbohydrate graft copolymer comprises solution polymerizing the monomer onto the carbohydrate to form the carbohydrate graft copolymer in water.

4. The method of claim 1, wherein graft polymerizing the monomer onto the carbohydrate to form the carbohydrate graft copolymer comprises graft polymerizing an unsaturated carboxylic acid monomer onto the carbohydrate to form the carbohydrate graft copolymer.

5. The method of claim 4, wherein graft polymerizing the unsaturated carboxylic acid monomer onto the carbohydrate to form the carbohydrate graft copolymer comprises graft polymerizing acrylic acid onto the carbohydrate to form the carbohydrate graft copolymer.

6. The method of claim 1, further comprising neutralizing the monomer.

7. The method of claim 6, wherein neutralizing the monomer comprises applying potassium hydroxide solution to the monomer.

8. The method of claim 1, wherein graft polymerizing the monomer onto the carbohydrate to form the carbohydrate graft copolymer comprises graft polymerizing the monomer onto a polysaccharide to form the carbohydrate graft copolymer.

9. The method of claim 1, wherein the weight ratio of the carbohydrate to the monomer can range from 1:1 to 1:8.

10. The method of claim 1, wherein graft polymerizing the monomer onto the carbohydrate to form the carbohydrate graft copolymer comprises graft polymerizing the monomer onto the carbohydrate to form the carbohydrate graft copolymer in the presence of an initiator.

11. The method of claim 10, wherein the initiator can be is selected from the group consisting of a redox initiator, a thermal initiator, and a mixture of the redox initiator and the thermal initiator.

12. The method of claim 1, wherein modifying the adsorbent with the cationic surfactant to form the surfactant modified adsorbent comprises modifying nanosized zeolite-A with the cationic surfactant to form the surfactant modified adsorbent.

13. The method of claim 1, wherein modifying the adsorbent with the cationic surfactant to form the surfactant modified adsorbent comprises modifying nanosized clinoptilolite with the cationic surfactant to form the surfactant modified adsorbent.

14. The method of claim 1, wherein the adsorbent is selected from the group consisting of hexadecyltrimethyl ammonium bromide (HDTMA-Br), hexadecyltrimethylammonium chloride (HDTMA-Cl), hexadecyltrimethylammonium hydrogen sulfate (HDTMA-HSO4), triethylammonium bromide, trimethylammonium bromide, benzyltriethylammonium chloride, sodium lauryl sulphate, tetrapropoylammonium bromide (TPA-Br), tetrabutylammonium bromide (TBA-Br), tetramethylammonium bromide (TMA-Br), and tetrabutylammonium hydroxide (TBA-OH).

15. The method of claim 1, wherein isolating the crosslinked carbohydrate graft copolymer comprises drying the crosslinked carbohydrate graft copolymer.

16. The method of claim 1, wherein isolating the crosslinked carbohydrate graft copolymer comprises extruding the crosslinked carbohydrate graft copolymer.

17. The method of claim 1, wherein isolating the crosslinked carbohydrate graft copolymer comprises coating the crosslinked carbohydrate graft copolymer to minimize reagglomeration.

18. The method of claim 1, wherein the crosslinked carbohydrate graft copolymer is a nanocomposite ion exchange hydrogel.

19. The method of claim 1, further comprising gelatinizing the carbohydrate.

* * * * *